US010488607B2

(12) United States Patent
Yeh

(10) Patent No.: US 10,488,607 B2
(45) Date of Patent: Nov. 26, 2019

(54) OPTICAL TRANSCEIVER HOUSING STRUCTURE

(71) Applicant: EZCONN CORPORATION, Taipei (TW)

(72) Inventor: Pin-Chen Yeh, Taipei (TW)

(73) Assignee: EZconn Corporation, Taipei (TW)

( * ) Notice: Subject to any disclaimer, the term of this patent is extended or adjusted under 35 U.S.C. 154(b) by 0 days.

(21) Appl. No.: 16/011,843

(22) Filed: Jun. 19, 2018

(65) Prior Publication Data

US 2018/0364429 A1 Dec. 20, 2018

(30) Foreign Application Priority Data

Jun. 20, 2017 (TW) .............................. 106120642 A

(51) Int. Cl.
*G02B 6/42* (2006.01)
*G02B 6/38* (2006.01)

(52) U.S. Cl.
CPC ......... *G02B 6/4261* (2013.01); *G02B 6/3893* (2013.01); *G02B 6/428* (2013.01); *G02B 6/4246* (2013.01); *G02B 6/4277* (2013.01)

(58) Field of Classification Search
CPC ..................................................... G02B 6/426
See application file for complete search history.

(56) References Cited

U.S. PATENT DOCUMENTS

2015/0241646 A1* 8/2015 Wang .................... G02B 6/423
385/92

* cited by examiner

*Primary Examiner* — Jerry Rahll

(57) ABSTRACT

An optical transceiver housing structure comprising a first latch arm, a second latch arm, a fixing mechanism, and a release mechanism is provided. The first and the second latch arms have a first and a second guide slot disposed on bottom ends thereof, respectively. The fixing mechanism is attached to the first latch arm and second latch arm at a top end thereof and the release mechanism is attached to the first latch arm and second latch arm at a bottom end thereof. Two side guide lugs of an optical transceiver are moveable in the first guide slot and the second guide slot, respectfully. When the release mechanism moves toward the optical transceiver, the first and the second latch arms slide along the first and second guide slots to move the fixing mechanism in an opposite direction away from the optical transceiver.

14 Claims, 4 Drawing Sheets

OPTICAL TRANSCEIVER HOUSING STRUCTURE

RELATED APPLICATIONS

The present application claims priority to Taiwan application no. 106120642, filed on Jun. 20, 2017, of which is hereby incorporated by reference in its entirety.

BACKGROUND OF THE INVENTION

Field of the Invention

The invention relates to optical transceivers, and more particularly, to optical transceiver housing structures.

Description of the Related Art

Optoelectronic transceivers are increasingly being used in electronic and optical communications. In the field of optical communications, the optoelectronic transceiver has always been a key component for photoelectric conversion. Data rate transmission of optoelectronic transceivers range from 155 megabit (Mb)/s to 2.5 gigabit (Gb)/s. The different data rates combined with different multi-source agreements (MSAs) between multiple manufactures determine the different packaging specifications of the optoelectronic transceivers. Examples of MSAs include the small form-factor (SFF), small form-factor pluggable (SFP), enhanced small form-factor pluggable (SFP+), XFP (10 Gb Ethernet), X2 (10 Gb Ethernet), Xenpak (10 Gb Ethernet), and gigabit interface converter (GBIC) MSA agreements.

For the fixed SFF optoelectronic transceiver package, when it is assembled in a system, it is not easy to be disassembled. However, for the SFP and GBIC optoelectronic transceiver packages, as they are pluggable-type packages, assembly and disassembly thereof are more convenient. Nonetheless, for pluggable-type optoelectronic transceiver packages, other issues must be considered for optimal performance, such as electromagnetic interference and reliability of the package after multiple times of plugging and unplugging.

With increased usage of optical transmission due to the increased demand for higher bandwidth and faster speed connections, more and more is being required for the supporting components and systems thereof, including optical transceivers. Accordingly, the issues of optimal performance, such as electromagnetic interference and reliability of the package after multiple times of plugging and unplugging, become even more challenging driven by the increased demand for smaller and smaller packages.

There is demand for optical transceiver housing structures to solve the aforementioned problem.

BRIEF SUMMARY OF THE INVENTION

Optical transceiver housing structures are provided.

In an embodiment, an optical transceiver housing structure comprising a first latch arm, a second latch arm, a fixing mechanism, and a release mechanism is provided. The first and the second latch arms have a first and a second guide slots disposed on bottom ends thereof, respectively. The first latch arm is disposed opposite to the second latch arm. The fixing mechanism is attached to the first latch arm and second latch arm at a top end thereof and the release mechanism is attached to the first latch arm and second latch arm at a bottom end thereof. The fixing mechanism is disposed opposite to the release mechanism.

In an alternative embodiment, in addition to the first latch arm, second latch arm, fixing mechanism, and release mechanism, the optical transceiver housing structure further comprises a snap-fit protrusion on a bottom end thereof, wherein when a cover is assembled to the optical transceiver housing structure, the snap-fit protrusion snaps into a snap-fit slot of a snap-fit arm of the cover.

In an embodiment, two side guide lugs of an optical transceiver are moveable in the first guide slot and the second guide slot, respectfully. When the release mechanism moves toward the optical transceiver, the first and the second latch arms slide along the first and second guide slots to move the fixing mechanism in an opposite direction away from the optical transceiver.

In another alternative embodiment, an optical transceiver housing structure comprising a first latch arm, a second latch arm, a first guide lock, a second guide lock, a fixing mechanism, and a release mechanism is provided. The first and the second latch arms have a first and a second guide slots disposed on bottom ends thereof, respectively. The first and the second guide locks are assembled to the first and second latch arms, respectively. The first latch arm is disposed opposite to the second latch arm. The fixing mechanism is attached to the first latch arm and second latch arm at a top end thereof and the release mechanism is attached to the first latch arm and second latch arm at a bottom end thereof. The fixing mechanism is disposed opposite to the release mechanism.

In yet another alternative embodiment, in addition to the first latch arm, second latch arm, first guide lock, second guide lock, fixing mechanism, and release mechanism, the optical transceiver housing structure further comprises a snap-fit protrusion on a bottom end thereof, wherein when a cover is assembled to the optical transceiver housing structure, the snap-fit protrusion snaps into a snap-fit slot of a snap-fit arm of the cover.

In an alternative embodiment, two side guide lugs of an optical transceiver are moveable in the first guide slot and the second guide slot, respectfully. When the release mechanism moves toward the optical transceiver, the first and the second latch arms slide along the first and second guide slots to move the fixing mechanism in an opposite direction away from the optical transceiver. Concurrently, the first and the second guide locks contact a release plate assembly of the optical transceiver, moving the release plate assembly such that the snap-fit slot of the cover disengages from the snap-fit protrusion of the optical transceiver housing structure.

In the embodiments, as an example, and not to be limiting, the first latch arm, second latch arm, fixing mechanism, and release mechanism are made from a material consisting of zinc, copper, aluminum, stainless steel, iron, or magnesium or any combination thereof.

In the embodiments, as an example, and not to be limiting, the first and second guide slots can be arc-shaped, rectangular-shaped or any other shape, so long two side guide lugs of an optical transceiver are moveable therein.

In the embodiments, as an example, and not to be limiting the arc of the first and second guide slots have an arc of between 7/6 and 7/2; however, the invention is not limited thereto. In another embodiment the arc of the first and second guide slots are between 7/4 and 7/2.

In the embodiments, the optical transceiver comprises a printed circuit board having an optical transmitter module, optical receiver module, a plurality of electronic components and a plurality of leads assembled thereto, as an example, and not to be limiting. The optical transmitter module can comprise an optical transmitter having a laser and the optical receiver module can comprise an optical receiver.

In alternative embodiments, the optoelectronic transceiver further comprises a shield attachment surrounding a front end thereof, reducing electromagnetic interference.

These, as well as other components, steps, features, benefits, and advantages of the present application, will now made clear by reference to the following detailed description of the embodiments, the accompanying drawings, and the claims.

BRIEF DESCRIPTION OF THE DRAWINGS

The accompanying drawings, which are incorporated herein and form a part of the Detailed Description of the Invention, illustrate various embodiments of the present invention and, together with the Detailed Description of the Invention, serve to explain principles discussed below. The drawings referred to in this Brief Description of Drawings should not be understood as being drawn to scale unless specifically noted.

DETAILED DESCRIPTION OF THE INVENTION

Figure 1:
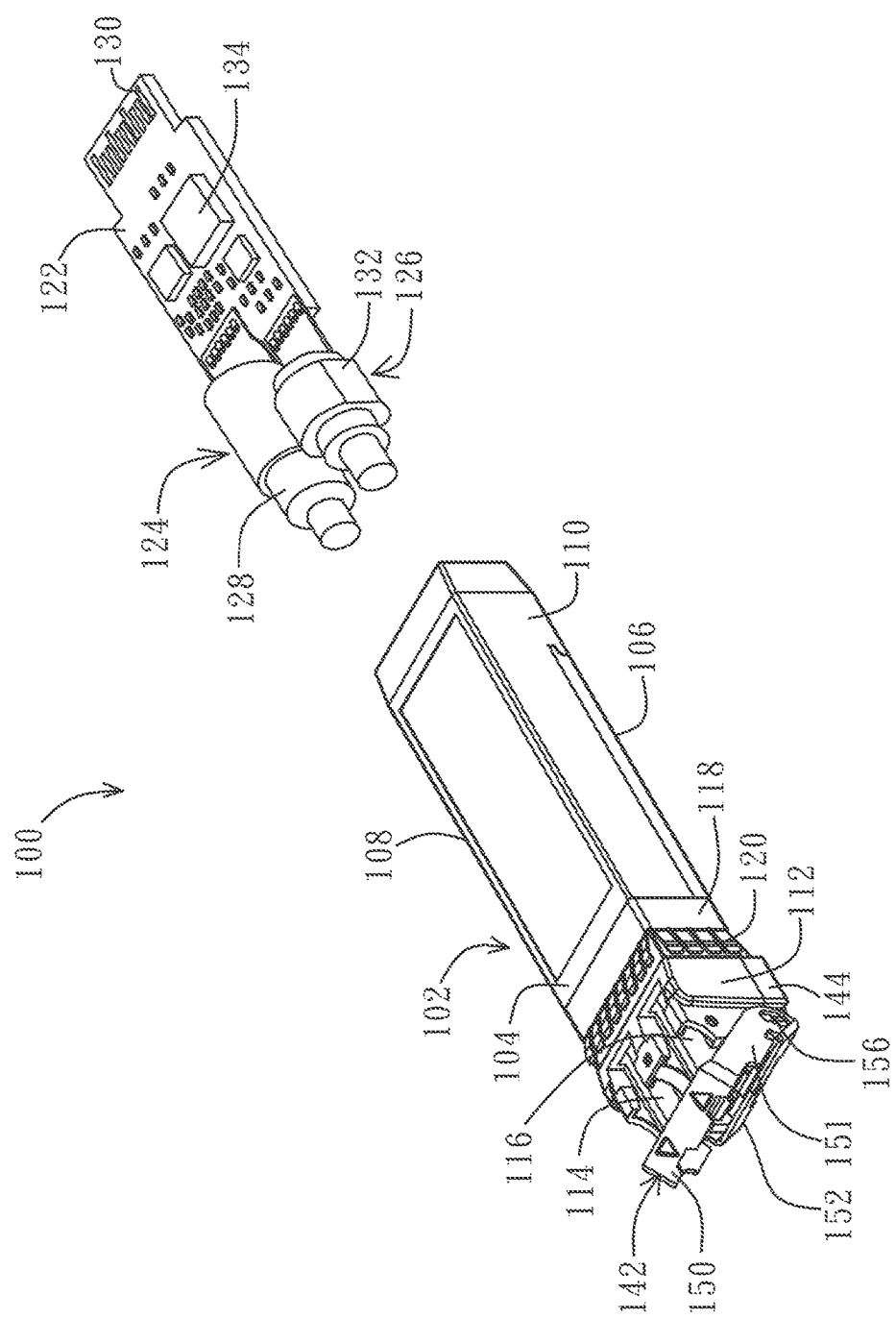
FIG. 1 is a perspective view illustrating an optical transceiver housing structure according to various embodiments.

It is understood that the following disclosure provides many different embodiments, or examples, for implementing different features of the invention. Specific examples of devices and arrangements are described below to simplify the present disclosure. These are, of course, merely examples and are not intended to be limiting. For example, the formation of a first feature over or on a second feature in the description that follows can include embodiments in which the first and second features are formed in direct contact, and can also include embodiments in which additional features are formed between the first and second features, such that the first and second features are not in direct contact. In addition, the present disclosure can repeat reference numerals and/or letters in the various examples. This repetition is for the purpose of simplicity and clarity and does not in itself dictate a relationship between the various embodiments and/or configurations discussed. It is intended that the scope of the present technology be defined by the claims appended hereto and their equivalents.

An optical transceiver housing structure comprising a first latch arm, a second latch arm, a fixing mechanism, and a release mechanism is provided. The first and the second latch arms have a first and a second guide slot disposed on bottom ends thereof, respectively. The fixing mechanism is attached to the first latch arm and second latch arm at a top end thereof and the release mechanism is attached to the first latch arm and second latch arm at a bottom end thereof. Two side guide lugs of an optical transceiver are moveable in the first guide slot and the second guide slot, respectfully. When the release mechanism moves toward the optical transceiver, the first and the second latch arms slide along the first and second guide slots to move the fixing mechanism in an opposite direction away from the optical transceiver.

In the embodiments, the data rate transmission of the optoelectronic transceiver 100, as an example, and not to be limiting, can range from 1 Gb/s to 2.5 Gb/s, such as 1 Gb/s, 2 Gb/s, 4 Gb/s, 8 Gb/s, 10 Gb/s, and 2.5 Gb/s or any combination thereof. The wavelength of the optoelectronic transceiver 100, as an example, and not to be limiting, can comprise 850 nm, 1310 nm, 1470 nm, 1490 nm, 1510 nm, 1530 nm, 1550 nm, 1570 nm, 1590 nm and 1610 nm or any combination thereof. The protocol and form factor of the optoelectronic transceiver 100, as an example, and not to be limiting, can comprise 1×, 2×, 4×, and 10× fibre channel complaint protocols and optical fast, gigabit and 10 Gb Ethernet compliant protocols, and the small form-factor (SFF), small form-factor pluggable (SFP), enhanced small form-factor pluggable (SFP+), XFP (10 Gb Ethernet), X2 (10 Gb Ethernet), Xenpak (10 Gb Ethernet), and gigabit interface converter (GBIC) MSA agreement form factors or any combination thereof.

Figure 2:
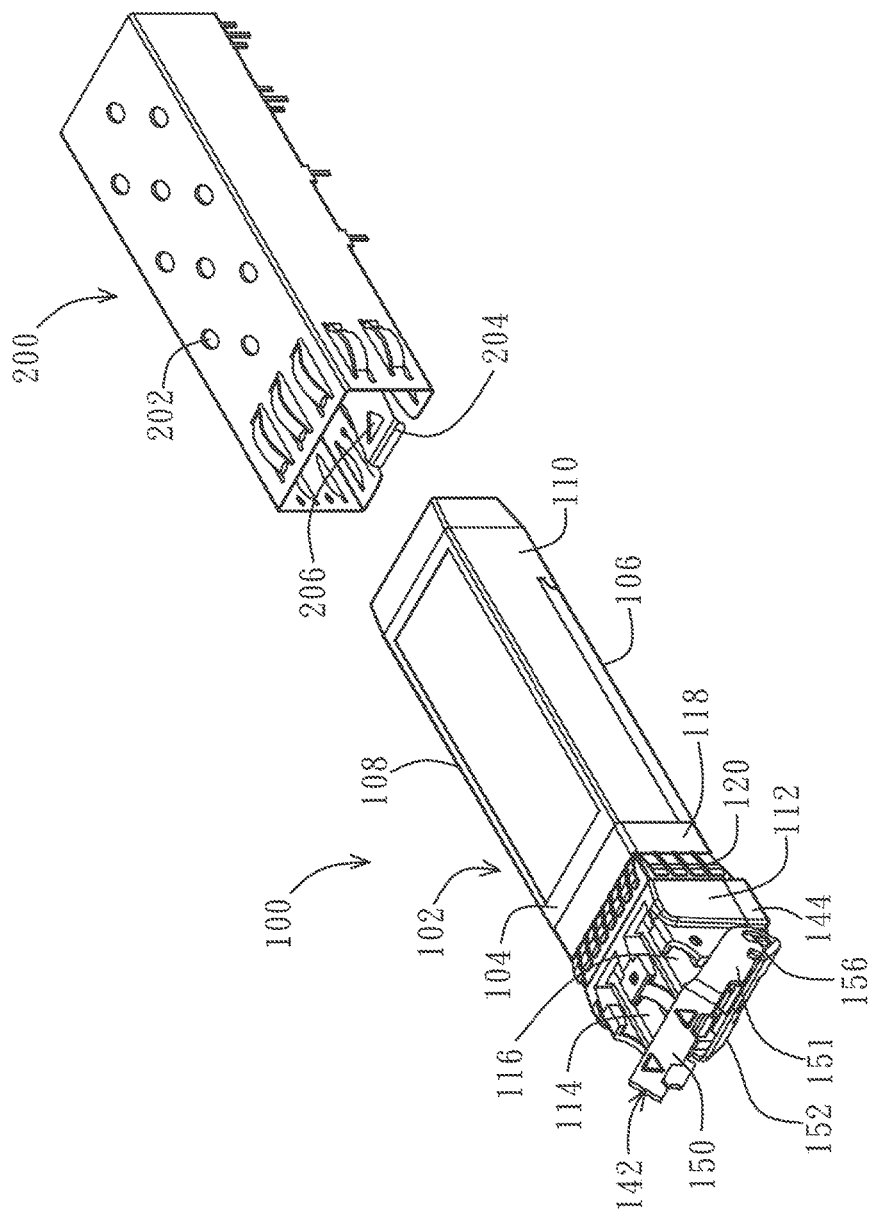
FIG. 2 is a perspective view illustrating an optical transceiver housing structure having a cover according to various embodiments.

FIG. 1 is a perspective view illustrating an optical transceiver housing structure according to various embodiments. FIG. 2 is a perspective view illustrating an optical transceiver housing structure having a cover according to various embodiments. As shown in FIGS. 1 and 2, in an embodiment, an optical transceiver housing structure comprises a first latch arm 151, a second latch arm 151, a fixing mechanism 150, and a release mechanism 152. The first and the second latch arms 151 have first and second guide slots 156 disposed on bottom ends thereof, respectively. The first latch arm 151 is disposed opposite to the second latch arm 151. The fixing mechanism 150 is attached to the first latch arm 151 and second latch arm 151 at a top end thereof and the release mechanism 152 is attached to the first latch arm 151 and second latch arm 151 at a bottom end thereof. The fixing mechanism 150 is disposed opposite to the release mechanism 152.

In the embodiments, as an example, and not to be limiting, the first latch arm 151, second latch arm 151, fixing mechanism 150, and release mechanism 152 is made from a material consisting of zinc, copper, aluminum, stainless steel, iron, or magnesium or any combination thereof.

In the embodiments, the optoelectronic transceiver 100 of the optical transceiver housing structure comprises a housing 102. As an example, the housing 102 can have an integrally formed top side 104, bottom side 106, first side 108, second side 110, and front end 112; however the invention is not limited thereto. The top side 104, bottom side 106, first side 108, second side 110, and front end 112 can also be individually formed, sectional formed, or any combination thereof. In the embodiments, the front end 112 comprises an optical transmitter port 114 and an optical receiver port 116. The electro-optical assembly of the optical transmitter port 114 and the optical receiver port 116, as an example, comprises a transmitter optical subassembly (TOSA) and a receiver optical subassembly (ROSA).

In the embodiments, as an example, a die casting process using zinc can be employed to fabricate the housing 102; however, the invention is not limited thereto. Other material can be employed using the die casting process to fabricate the housing 102, such as aluminum, copper, stainless steel, iron, or magnesium. In addition, other manufacturing methods can be employed to fabricate the housing 102, such as investment casting, metal injection molding (MIM), and plastic injection molding employing materials such as metallized plastics, metal-filled composites and the like.

In alternative embodiments, the optoelectronic transceiver 100 further comprises a shield attachment 118 surrounding a front end thereof. In an embodiment, the shield attachment 118 comprises a plurality of snap-fit fingers 120 flaring outwardly from a front end thereof. Both the shield attachment 118 and the plurality of snap-fit fingers 120 assist in reducing electromagnetic interference when the optoelectronic transceiver 100 is assembled to a motherboard (not illustrated).

In the embodiments, the optical transceiver 100 further comprises a printed circuit board 122, housed in the housing 102, having an optical transmitter module 124, optical receiver module 126, a plurality of electronic components 134 and a plurality of leads 130 assembled thereto, as an example, and not to be limiting. The optical transmitter module 124 can comprise a transmitter shell 128 having, as an example, an optical transmitter having a laser therein. The optical transmitter converts the electrical signals received from the host device (not illustrated) into corresponding optical signals via the plurality of leads 130 disposed on a back end of the printed circuit board 122. The optical receiver module 126 can comprise a receiver shell 132 having, as an example, an optical receiver having a light emitting diode (not illustrated) and fiber optic cable (not illustrated) therein. The optical receiver converts the optical signal received from the fiber optic cable into corresponding electrical signals to transmit to the host device (not illustrated) via the plurality of leads 130 disposed on a back end of the printed circuit board 122.

In the embodiments, the optical transceiver further comprises a plurality of electronic components 134 disposed on the printed circuit board 134. The plurality of electronic components 134 comprise, as an example, and not to be limiting, controllers, processors, laser drivers, post amplifiers, and passive components or any combination thereof. The plurality of electronic components 134 can function such that the optoelectronic transceiver 100 can conveniently and efficiently convert optical signals into electrical signals and vice versa.

In an embodiment, the optical transceiver housing structure does not comprise a cover; however, the invention is not limited thereto. In an alternative embodiment, in addition to the first latch arm 151, second latch arm 151, fixing mechanism 150, and release mechanism 152, the optical transceiver housing structure further comprises a cover 200 attached thereto. The cover 200 comprises a plurality of perforations 202 on a top side thereof, allowing heat to dissipate from the optical transceiver housing structure when the optical transceiver 100 is operating. The cover further comprises a snap-fit arm 204 disposed centrally on a bottom front end thereof having a snap-fit slot 206 therein.

Figure 3A:
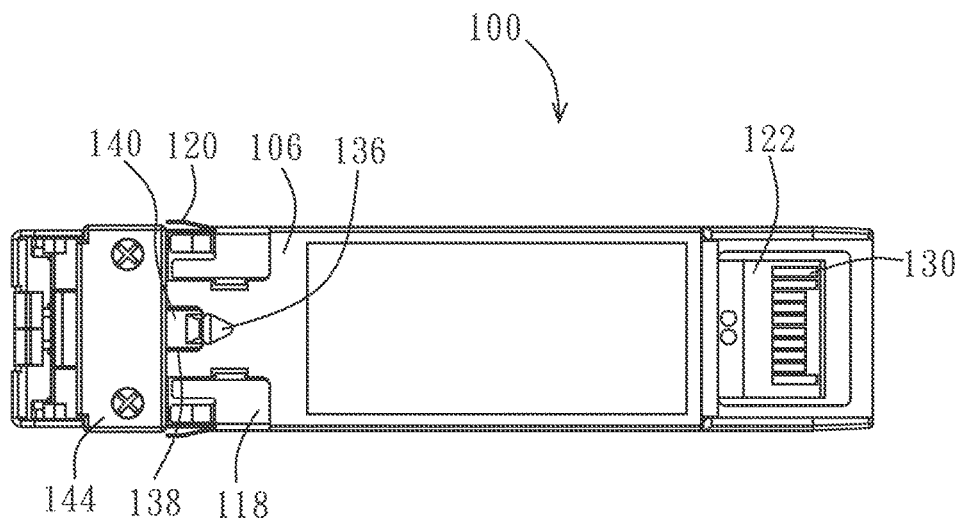
FIG. 3A is perspective bottom view illustrating an optical transceiver housing structure according to various embodiments.
Figure 3B:
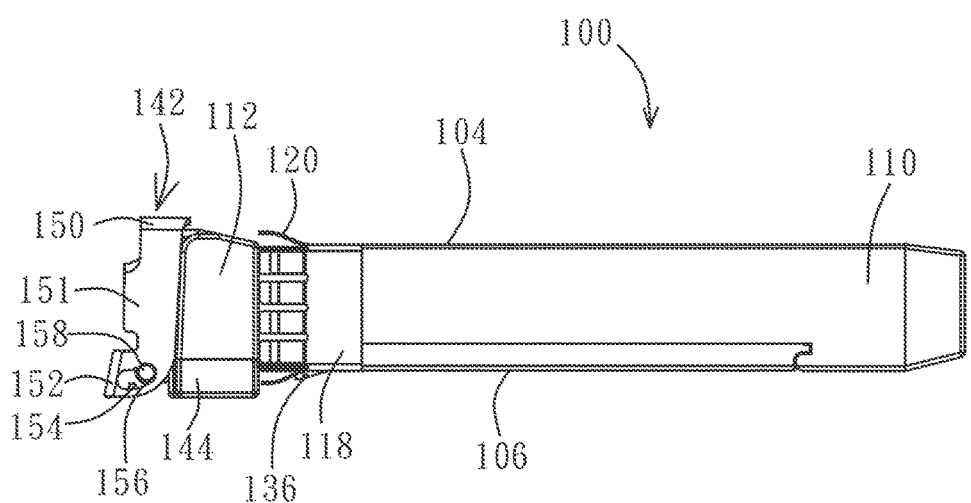
FIG. 3B is perspective side view illustrating an optical transceiver housing structure according to various embodiments.
Figure 4A:
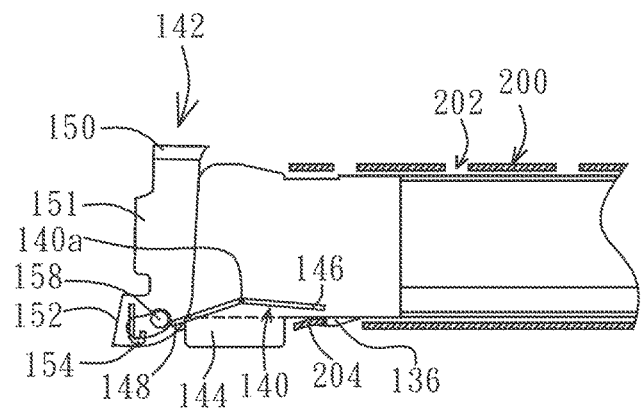
FIG. 4A is a partial cross-sectional view illustrating an optical transceiver housing structure having a rotatable latch in a fixed position according to various embodiments.
Figure 4B:
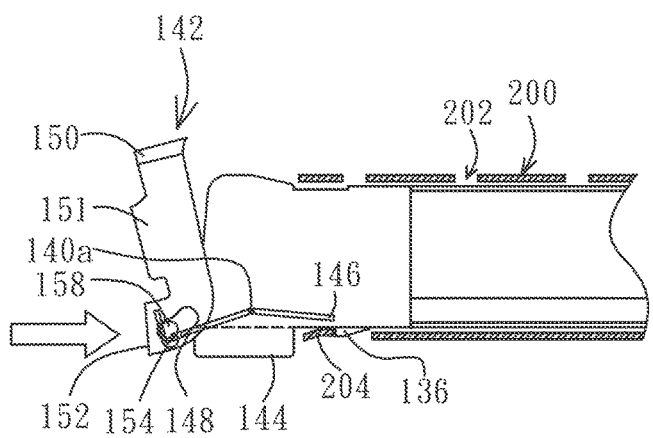
FIG. 4B is a partial cross-sectional view illustrating an optical transceiver housing structure having a rotatable latch in a semi-opened position according to various embodiments.
Figure 4C:
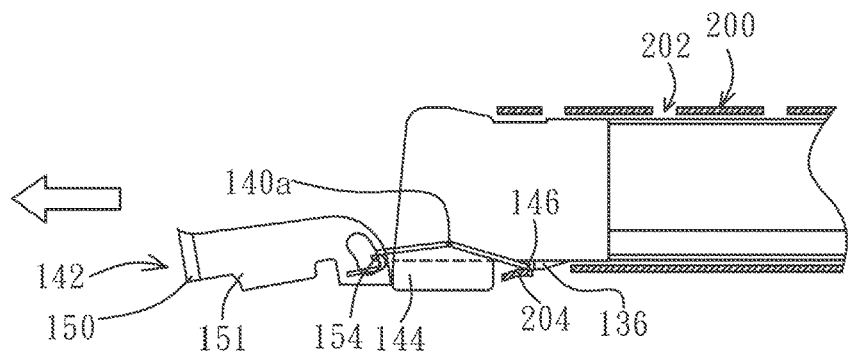
FIG. 4C is a partial cross-sectional view illustrating an optical transceiver housing structure having a rotatable latch in an opened position according to various embodiments.

FIG. 3A is perspective bottom view illustrating an optical transceiver housing structure according to various embodiments. FIG. 3B is perspective side view illustrating an optical transceiver housing structure according to various embodiments. FIG. 4A is a partial cross-sectional view illustrating an optical transceiver housing structure having a rotatable latch in a fixed position according to various embodiments. FIG. 4B is a partial cross-sectional view illustrating an optical transceiver housing structure having a rotatable latch in a semi-opened position according to various embodiments. FIG. 4C is a partial cross-sectional view illustrating an optical transceiver housing structure having a rotatable latch in an opened position according to various embodiments. As shown in FIGS. 3A to 4C, and referring again to FIGS. 1 and 2, the optoelectronic transceiver 100 further comprises a snap-fit protrusion 136 and a receiving opening 138 positioned centrally on a forward bottom side 106 thereof, and a pivotable release plate assembly 140 also positioned centrally on a forward bottom side 106 thereof.

In an embodiment, when the cover 200 is assembled to the optoelectronic transceiver 100, a snap-fit protrusion 136 on a bottom end thereof, snaps into the snap-fit slot 206 of the snap-fit arm 204 of the cover 200 for fixing. When covered, the release plate assembly 140 is also covered by the cover 200.

In an embodiment, the release plate assembly 140 comprises a first end 146, a second end 148, and a pivot joint 140a between the first end 146 and the second end 148, wherein the first end 146 is able to bend, relative to the second end 148. In the embodiments, as an example, and not to be limiting, the angle of bend between the first end 146 and second end 148 is between 120° degrees to 170° degrees; however, the invention is not limited thereto. In an alternative embodiment the angle of bend between first end 146 and second end 148 is between 130° degrees to 160° degrees. In the embodiments, as an example, and not to be limiting, the release plate assembly 140 is made of metal; however, the invention is not limited thereto. The release plate assembly 140 can be made of zinc, copper, aluminum, stainless steel, iron, magnesium, or any combination thereof.

In an embodiment, when the release plate assembly 140 is bent, if the second end 148 moves toward the top side 104 of the optical transceiver 100, the first end 146 will protrude from the receiving opening 138. In an alternative embodiment, when the release plate assembly 140 bends, if the second end 148 moves toward the bottom side 106 of the optical transceiver 100, the first end 146 will move toward the top side 104 of the optical transceiver 100, retreating from the receiving opening 138.

In an alternative embodiment, the optical transceiver housing structure further comprises a rotatable latch 142 comprising a first latch arm 151, a second latch arm 151, a first guide lock 154, a second guide lock 154, a fixing mechanism 150, and a release mechanism 152. The first and the second latch arms 151 have first and second guide slots 156 disposed on bottom ends thereof, respectively. The first and the second guide locks 154 are assembled to the first and second latch arms 151, respectively. The first latch arm 151 is disposed opposite to the second latch arm 151, and as an example, and not to be limiting, edges thereof can be positioned flush with edges of the sides of the front end 112 of the optoelectronic transceiver 100, and along a same plane as the first side 108 and second side 110 of the optoelectronic transceiver 100. The fixing mechanism 150 is attached to the first latch arm 151 and second latch arm 151 at a top end thereof and the release mechanism 152 is attached to the first latch arm 151 and second latch arm 151 at a bottom end thereof. The fixing mechanism 150 is disposed opposite to the release mechanism 152, and as an example, and not to be limiting, an end thereof can hang over a top front edge of the front end 112 of the optoelectronic transceiver 100.

In an embodiment, the front end 112 of the optoelectronic transceiver 100 further comprises two side guide lugs 158, moveable in the first guide slot 156 and the second guide slot 156, respectfully. When the release mechanism 152 moves toward the optical transceiver 100, the first and the second latch arms 151 slide along the first and second guide slots 156 to move the fixing mechanism 150 in an opposite direction away from the optical transceiver 100. When the fixing mechanism 150 moves downward, an end of the guide lock 154 causes the release plate assembly 140 to bend, such that the second end 148 moves toward the top side 104 of the optical transceiver 100 and the first end 146 will protrude from the receiving opening 138. Concurrently, the snap fit arm 204 of the cover 200 will be pushed out of the receiving opening 138 such that the snap-fit slot 206 disengages from the snap-fit protrusion 136 of the optical transceiver housing structure. When the fixing mechanism 150 moves toward the optical transceiver 100, the first and the second latch arms 151 slide along the first and second guide slots 156 to move the release mechanism 152 in an opposite direction away from the optical transceiver 100. When the release plate assembly 140 bends, if the second end 148 moves toward the bottom side 106 of the optical transceiver 100, the first end 146 will move toward the top side 104 of the optical transceiver 100, retreating from the receiving opening 138.

In the embodiments, as an example, and not to be limiting, the first and second guide slots 156 can be arc-shaped, rectangular-shaped or any other shape, so long two side guide lugs 158 of an optical transceiver 100 are moveable therein.

In the embodiments, as an example, and not to be limiting the arc of the first and second guide slots 156 have an arc of between $\pi/6$ and $\pi/2$; however, the invention is not limited thereto. In another embodiment the arc of the first and second guide slot 156s are between $\pi/4$ and $\pi/2$.

Optoelectronic transceivers are increasingly being used in electronic and optical communications. The different data rates combined with different multi-source agreements (MSAs) between multiple manufactures determine the different packaging specifications of the optoelectronic transceivers. For the small form-factor pluggable (SFP) and gigabit interface converter (GBIC) optoelectronic transceiver packages, as they are pluggable-type packages, assembly and disassembly thereof are more convenient. Nonetheless, for pluggable-type optoelectronic transceiver packages, other issues must be considered for optimal performance, such as electromagnetic interference and reliability of the package after multiple times of plugging and unplugging.

The optical transceiver housing structure of the embodiments employs guide slots 156, and a release mechanism 152 of a rotatable latch 142, among other design features to enable users to fix and release the rotatable latch 142 conveniently and efficiently. The optical transceiver housing structure comprises a first latch arm 151, a second latch arm 151, a fixing mechanism 150, and a release mechanism 152 is provided. The first and the second latch arms 151 have a first and a second guide slot 156 disposed on bottom ends thereof, respectively. The fixing mechanism 150 is attached to the first latch arm 151 and second latch arm 151 at a top end thereof and the release mechanism 152 is attached to the first latch arm 151 and second latch arm 151 at a bottom end thereof. Two side guide lugs 158 of an optical transceiver 100 are moveable in the first guide slot 156 and the second guide slot 156, respectfully. When the release mechanism 152 moves toward the optical transceiver 100, the first and the second latch arms 151 slide along the first and second guide slots 156 to move the fixing mechanism 150 in an opposite direction away from the optical transceiver 100. Concurrently, first and the second guide locks 154 contact a release plate assembly 140 of the optical transceiver housing structure, moving the release plate assembly 140 such that the snap-fit slot 206 of the cover 200 disengages from the snap-fit protrusion 136 of the optical transceiver housing structure.

Unless otherwise indicated, all numbers used herein to express quantities, dimensions, and so forth used should be understood as being modified in all instances by the term "about." The use of the singular includes the plural unless specifically stated otherwise, and use of the terms "and" and "or" means "and/or" unless otherwise indicated.

From the foregoing it will be appreciated that, although specific embodiments have been described herein for purposes of illustration, various modifications can be made without deviating from the spirit and scope of the disclosure. Furthermore, where an alternative is disclosed for a particular embodiment, this alternative can also apply to other embodiments even if not specifically stated.

What is claimed is:

1. An optical transceiver housing structure, comprising:
a first latch arm having a first guide slot disposed on a bottom end thereof;
a first guide lock assembled to the first latch arm;
a second latch arm, opposite the first latch arm, having a second guide slot disposed on a bottom end thereof;
a fixing mechanism attached to the first latch arm and second latch arm at a top end thereof; and
a release mechanism, opposite the fixing mechanism, attached to the first latch arm and second latch arm at a bottom end thereof,
wherein two side guide lugs of an optical transceiver are moveable in the first guide slot and the second guide slot, respectfully, and
wherein when the release mechanism moves toward the optical transceiver, the first and the second latch arms slide along the first and second guide slots, respectively, moving the fixing mechanism in an opposite direction away from the optical transceiver and the first guide lock contacts a release plate assembly of the optical transceiver, moving the release plate assembly.

2. The optical transceiver housing structure of claim 1, further comprising a second guide lock assembled, to the second latch arm, wherein when the release mechanism moves toward the optical transceiver, the second guide lock contacts the release plate assembly of the optical transceiver, moving the release plate assembly.

3. The optical transceiver housing structure of claim 1, further comprising a snap-fit protrusion on a bottom end thereof, wherein when a cover is assembled to the optical transceiver housing structure, the snap-fit protrusion snaps into a snap-fit slot of a snap-fit arm of the cover.

4. The optical transceiver housing structure of claim 1, further comprising:
a snap-fit protrusion on a bottom end of the optical transceiver housing structure, wherein when a cover is assembled to the optical transceiver housing structure, the snap-fit protrusion snaps into a snap-fit slot of a snap-fit arm of the cover, wherein moving the release plate assembly via the first guide lock disengages the snap-fit slot of the cover from the snap-fit protrusion of the optical transceiver housing structure.

5. The optical transceiver housing structure of claim 1, further comprising:
   a second guide lock assembled to the second latch arm, wherein when the release mechanism moves toward the optical transceiver, the second guide lock contacts the release plate assembly of the optical transceiver, moving the release plate assembly;
   a snap-fit protrusion on a bottom end of the optical transceiver housing structure, wherein when a cover is assembled to the optical transceiver housing structure, the snap-fit protrusion snaps into a snap-fit slot of a snap-fit arm of the cover
   wherein moving the release plate assembly via the second guide lock disengages the snap-fit slot of the cover from the snap-fit protrusion of the optical transceiver housing structure.

6. The optical transceiver housing structure of claim 1, wherein the first latch arm, second latch arm, fixing mechanism and release mechanism are made from a material consisting of zinc, copper, aluminum, stainless steel, iron, or magnesium or any combination thereof.

7. The optical transceiver housing structure of claim 1, wherein the first and second guide slots are arc-shaped.

8. The optical transceiver housing structure of claim 1, wherein the first and second guide slots are rectangular-shaped.

9. The optical transceiver housing structure of claim 1, wherein the optical transceiver comprises a printed circuit board having an optical transmitter module, optical receiver module, a plurality of electronic components and a plurality of leads assembled thereto.

10. The optical transceiver housing structure of claim 9, wherein the optical transmitter module comprises an optical transmitter having a laser.

11. The optical transceiver housing structure of claim 9, wherein the optical receiver module comprises an optical receiver.

12. The optical transceiver housing structure of claim 1, wherein the optoelectronic transceiver further comprises a shield attachment surrounding a front end thereof, reducing electromagnetic interference.

13. The optical transceiver housing structure of claim 1, wherein the first and second guide slots are arc-shaped, having an arc of between $\pi/6$ and $\pi/2$.

14. The optical transceiver housing structure of claim 1, wherein the first and second guide slots are arc-shaped, having an arc of between $\pi/4$ and $\pi/2$.

* * * * *